(12) United States Patent
Lopes et al.

(10) Patent No.: US 10,143,868 B2
(45) Date of Patent: Dec. 4, 2018

(54) CABLE FIRESTOPPING APPARATUS

(71) Applicant: Specified Technologies Inc., Somerville, NJ (US)

(72) Inventors: Julio Lopes, Dunellen, NJ (US); Steven Faiello, Morristown, NJ (US)

(73) Assignee: Specified Technologies Inc., Somerville, NJ (US)

( * ) Notice: Subject to any disclaimer, the term of this patent is extended or adjusted under 35 U.S.C. 154(b) by 0 days.

(21) Appl. No.: 15/615,885

(22) Filed: Jun. 7, 2017

(65) Prior Publication Data

US 2017/0354836 A1    Dec. 14, 2017

Related U.S. Application Data (60) Provisional application No. 62/347,140, filed on Jun. 8, 2016, provisional application No. 62/445,619, filed on Jan. 12, 2017.

(51) Int. Cl.
| | | |
|---|---|---|
| *A62C 2/06* | (2006.01) | |
| *A62C 3/16* | (2006.01) | |
| *F16L 5/04* | (2006.01) | |
| *H02G 3/04* | (2006.01) | |

(52) U.S. Cl.
CPC ............... *A62C 2/065* (2013.01); *A62C 3/16* (2013.01); *F16L 5/04* (2013.01); *H02G 3/0412* (2013.01)

(58) Field of Classification Search
CPC .. A62C 2/065; A62C 3/16; F16L 5/04; H02G 3/0412
See application file for complete search history.

(56) References Cited

U.S. PATENT DOCUMENTS

| 6,176,052 B1 * | 1/2001 | Takahashi .................. F16L 5/04 |
| | | 137/75 |
| 6,426,463 B2 * | 7/2002 | Munzenberger .......... F16L 5/04 |
| | | 174/77 R |
| 8,833,478 B2 * | 9/2014 | Zernach .................. A62C 2/065 |
| | | 169/48 |

(Continued)

FOREIGN PATENT DOCUMENTS

WO    WO 2012009211 A2 *    1/2012    ............. A62C 2/065

OTHER PUBLICATIONS

International Search Report and Written Opinion for PCT/US2017/036262 dated Sep. 25, 2017 (11 pages).*

*Primary Examiner* — Rodney Mintz
(74) *Attorney, Agent, or Firm* — Massina Pat. & TM Law PLLC (57) ABSTRACT

A firestopping apparatus including a housing having a wall surface extending between opposed front and rear panels with an inner chamber defined therein. The front panel defines a front opening therethrough and the rear panel defines a rear opening therethrough. The housing includes first and second housing members which are moveable relative to one another between an assembled condition wherein the first and second housing members are interconnected and the wall surface is substantially continuous about the internal chamber, and an open condition wherein at least a portion of the first and second housing members are spaced from one another such that at least a portion of the wall surface is non-contiguous to define an opening into the internal chamber. An intumescent material is positioned within the internal chamber.

20 Claims, 12 Drawing Sheets

(56) References Cited

U.S. PATENT DOCUMENTS

| | | | | |
|---|---|---|---|---|
| 9,046,194 B2* | 6/2015 | Gandolfo | ............... | F16L 5/04 |
| 9,220,932 B2* | 12/2015 | Zernach | ............... | A62C 2/065 |
| 9,586,066 B2* | 3/2017 | Klein | ............... | H02G 3/0412 |
| 9,759,352 B2* | 9/2017 | Lin | ............... | F16L 5/04 |
| 2006/0060369 A1* | 3/2006 | Hemingway | ............... | A62C 3/16 |
| | | | | 174/58 |
| 2010/0326678 A1* | 12/2010 | Monden | ............... | A62C 2/06 |
| | | | | 169/54 |
| 2012/0012347 A1* | 1/2012 | Zernach | ............... | A62C 2/065 |
| | | | | 169/48 |
| 2014/0318064 A1* | 10/2014 | Reinhardt | ............... | H02G 3/0412 |
| | | | | 52/317 |
| 2014/0367127 A1* | 12/2014 | Zernach | ............... | A62C 2/065 |
| | | | | 169/48 |
| 2015/0047276 A1* | 2/2015 | Gandolfo | ............... | F16L 5/04 |
| | | | | 52/220.8 |
| 2015/0251028 A1* | 9/2015 | Klein | ............... | H02G 3/0412 |
| | | | | 277/616 |
| 2016/0326745 A1* | 11/2016 | Lechuga | ............... | F16L 59/182 |
| 2016/0341341 A1* | 11/2016 | Lin | ............... | F16L 5/04 |
| 2017/0030491 A1* | 2/2017 | Lechuga | ............... | F16L 5/10 |
| 2017/0067264 A1* | 3/2017 | McAuley | ............... | E04G 15/061 |
| 2017/0335996 A1* | 11/2017 | Lin | ............... | F16L 5/04 |

\* cited by examiner

CABLE FIRESTOPPING APPARATUS

This application claims the benefit of U.S. Provisional Appln. No. 62/347,140, filed Jun. 8, 2016, and the benefit of U.S. Provisional Appln. No. 62/445,619, filed Jan. 12, 2017, the contents of each of which is incorporated herein.

FIELD OF THE INVENTION

The invention generally relates to apparatus for providing a firestop within a construction opening and, more particularly, to a firestopping apparatus configured to be positioned about a sleeve or cable opening and having intumescent pads that form a confinement area about penetrating members passing through the construction opening.

BACKGROUND OF THE INVENTION

It is commonplace in the construction and renovation of commercial and residential buildings for the need to pass cables, conduits and the like through construction barriers such as walls, floors and ceilings. However, the presence of an opening through such barriers raises a potential hazard in that a fire can use those opening to pass through the construction barrier, which of itself is an effective fire barrier, and the fire can then spread to adjoining areas of the building. As such, fire barriers are normally located within the openings that are designed to prevent the passage of fire through those openings.

Figure 1:
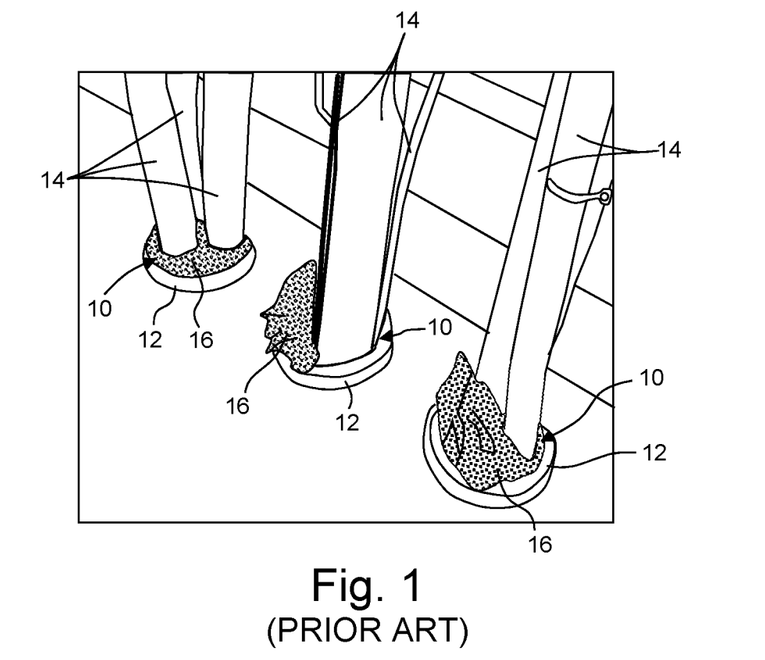
FIGS. 1 and 2 illustrate prior art building openings with cables and conduit extending through the openings and firestopping material, which may be inadequate, positioned in the openings.
Figure 2:
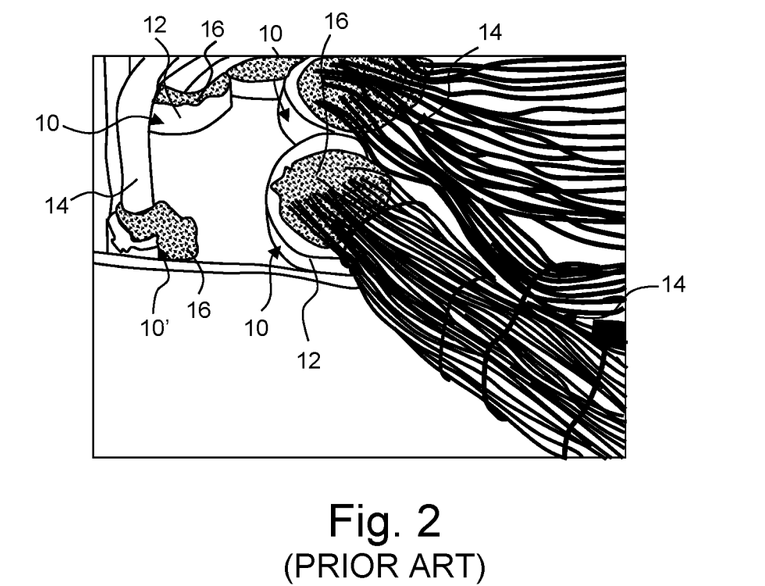

Referring to FIGS. 1 and 2, several exemplary building openings 10, 10' are shown with cables/conduits 14 passing therethrough. Some of the openings 10 include a sleeve 12 while some openings 10' simply have the conduit 14 pass without a sleeve. Sleeves 12 are short lengths of metal conduit, pipe, or EMT that project through a barrier. The NEC (NFPA 70) defines a sleeve to be a short length of raceway used to support and protect cables. Sleeves 12 are often field fabricated and may vary in length and quality. Occasionally, a plastic bushing is snapped onto the end of conduit.

The sleeves 12 and openings 10' are often properly firestopped during new construction by placing firestop materials 16 about the cables/conduit 14 to close off an open passageway through the opening 10' or sleeve 12. However, as cable moves, adds, and changes are made to structured cabling, the firestop materials 16 are displaced. When sleeves 12 are overfilled with cable 14, firestopping and life safety are compromised. This work is usually post occupancy and hence not subject to inspection. Often remaining firestop material 16 is inadequate to protect the opening 10, 10'.

Accordingly, there is a need for a firestopping apparatus that may be utilized to provide adequate firestopping about such openings 10, 10'.

SUMMARY OF THE INVENTION

In at least one embodiment, the present invention provides a firestopping apparatus including a housing having a wall surface extending between opposed front and rear panels with an inner chamber defined therein. The front panel defines a front opening therethrough and the rear panel defines a rear opening therethrough. The housing includes first and second housing members which are moveable relative to one another between an assembled condition wherein the first and second housing members are interconnected and the wall surface is substantially continuous about the internal chamber, and an open condition wherein at least a portion of the first and second housing members are spaced from one another such that at least a portion of the wall surface is non-contiguous to define an opening into the internal chamber. An intumescent material is positioned within the internal chamber.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 3-9, a firestopping apparatus 100 in accordance with an exemplary embodiment of the invention will be described. The firestopping apparatus 100 generally comprises first and second housing members 110, 120 that are interconnected to one another to define a housing 102 having an internal chamber 150. While the illustrated housing 102 has a square configuration, with each housing member having a rectangular configuration, the invention is not limited to such. The housing may have any desired configuration with the housing members having corresponding configurations.

Figure 8:
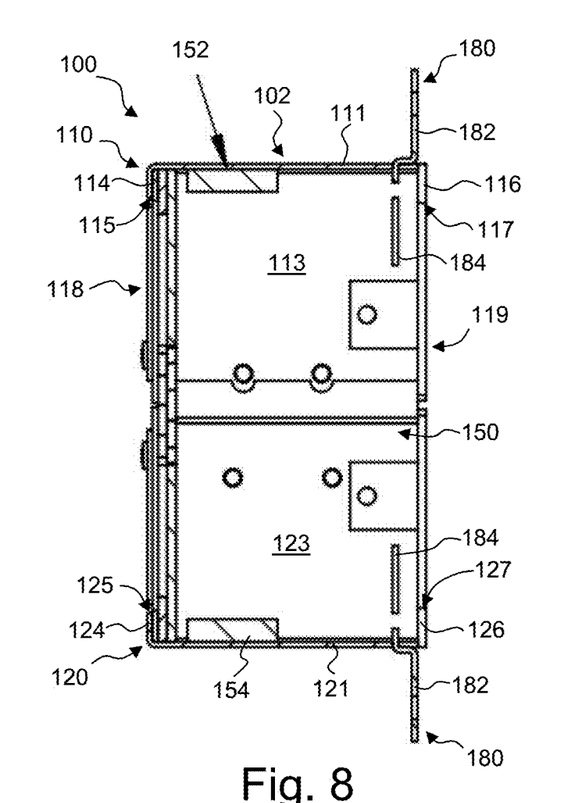
FIG. 8 is a cross-sectional view along the line 8-8 in FIG. 5.
Figure 9:
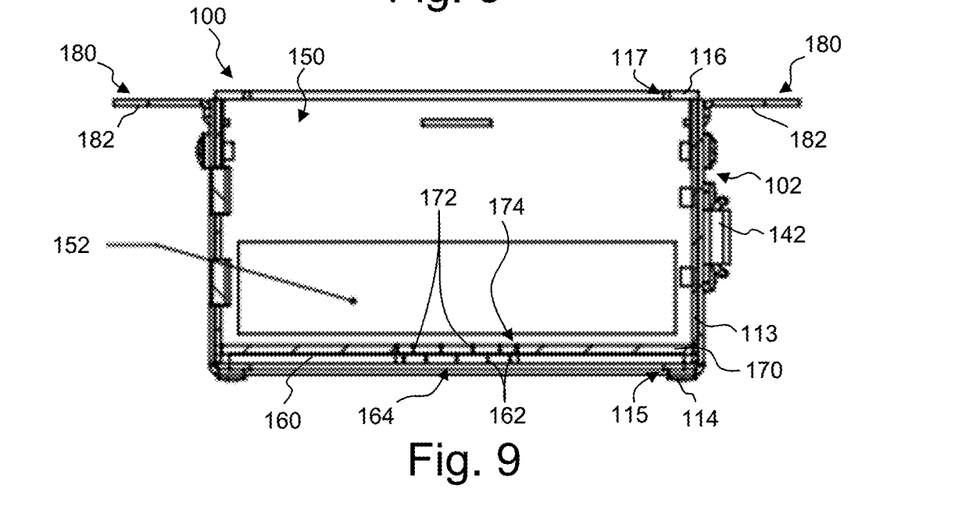
FIG. 9 is a cross-sectional view along the line 9-9 in FIG. 5.

With reference to FIGS. 8 and 9, intumescent firestopping materials 152, 154 are positioned in the internal chamber 150 and are designed to expand rapidly responsive to fire and heat for the purpose of sealing about any cables/conduits extending through the apparatus 100. The intumescent materials 152, 154 preferably include a foam component chosen of one of various polymers such as polyurethane or silicone or any other polymer which has the capability of forming a soft resilient foam. The intumescent component of the foam may include expandable graphite, sodium silicate or any other commonly used expansion ingredient which is compatible for use with the basic foam carrier construction. While two pads of intumescent materials 152, 154 are shown on opposite inside surfaces of the housing 102. The intumescent materials may include more or fewer pads and they may otherwise be positioned to provide a desired expansion of material.

In the illustrated embodiment, the first housing member 110 includes an end surface 111 and side panels 112, 113 extending between a front panel 114 and a rear panel 116. Similarly, the second housing member 120 includes an end surface 121 and side panels 122, 123 extending between a front panel 124 and a rear panel 126. Each of the front panels 114, 124 includes a semi-circular opening 115, 125 such that when the housing members 110, 120 are in an assembled condition as illustrated in FIGS. 3-9, a front opening 118 is defined in the housing 102. Similarly, each of the rear panels 116, 126 includes a semi-circular opening 117, 127 such that when the housing members 110, 120 are in an assembled condition, a rear opening 119 is defined in the housing 102. The front and rear openings 118, 119 are preferably coaxial and allow cables, conduits and the like to pass through the housing 102.

Figure 3:
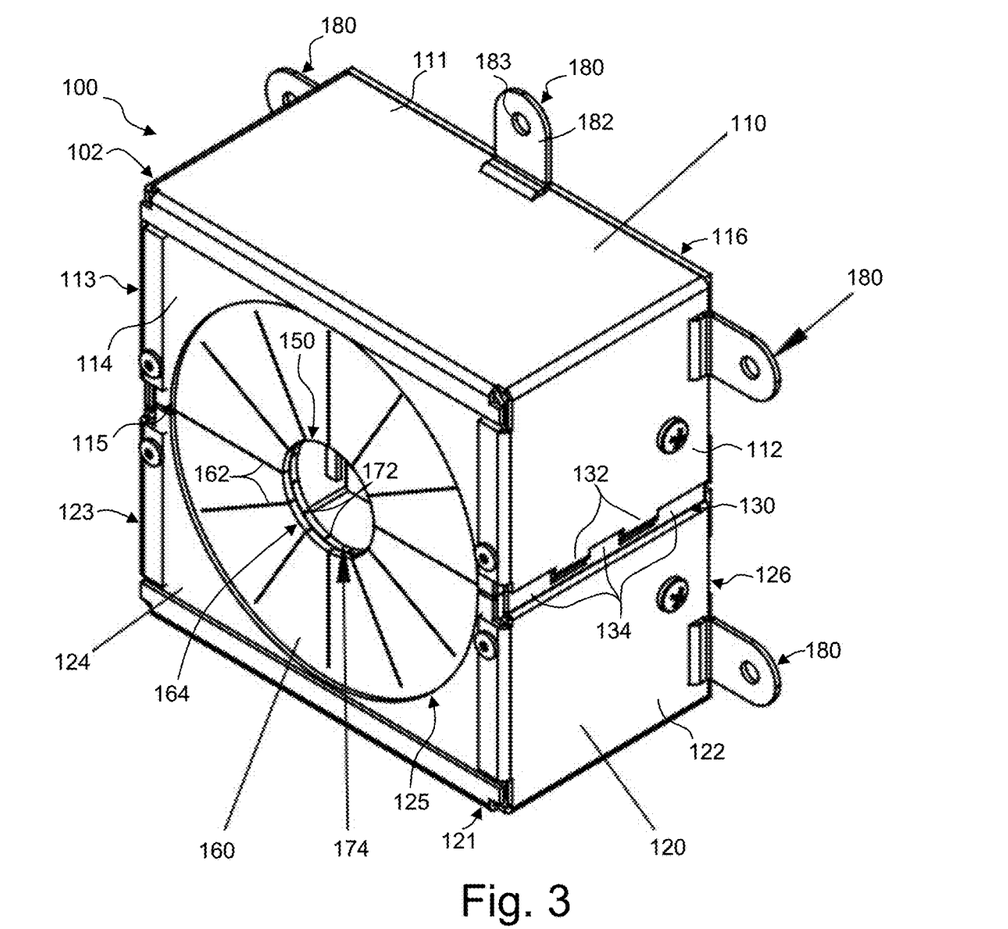
FIG. 3 is a front perspective view of an exemplary firestopping apparatus in accordance with an embodiment of the invention.
Figure 4:
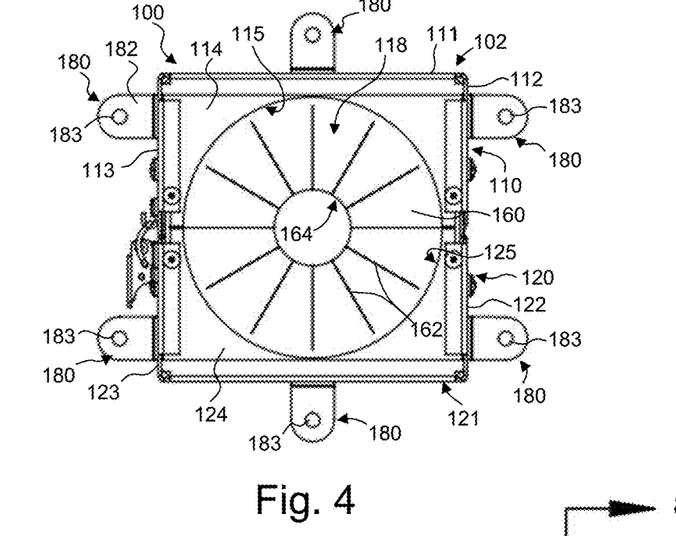
FIG. 4 is a front elevation view of the firestopping apparatus of FIG. 3.

In the illustrated embodiment, a pair of sealing elastomeric membranes 160, 170 extend across the front opening 118. The outer sealing membrane 160 extends to a central opening 164 and includes a series of radial slits 162 such that the membrane 160 may flex about cables or the like extending through the front opening 118. The inner sealing membrane 170 extends to a central opening 174 and also includes a series of radial slits 172. In the illustrated embodiment, the slits 162 are circumferentially offset from the slits 172 such that the membranes 160, 170 conform better to cables or the like extending through the front opening 118. The membranes 160, 170 can adjust to the cable load to provide remedial smoke and air sealing for the housing 102. While a pair of sealing membranes 160, 170 are illustrated, the invention is not limited to such and more or fewer membranes may be provided. Additionally, other types of seals, for example, a brush type seal, may be used in place of or in addition to the sealing membranes.

Figures 10, 11:
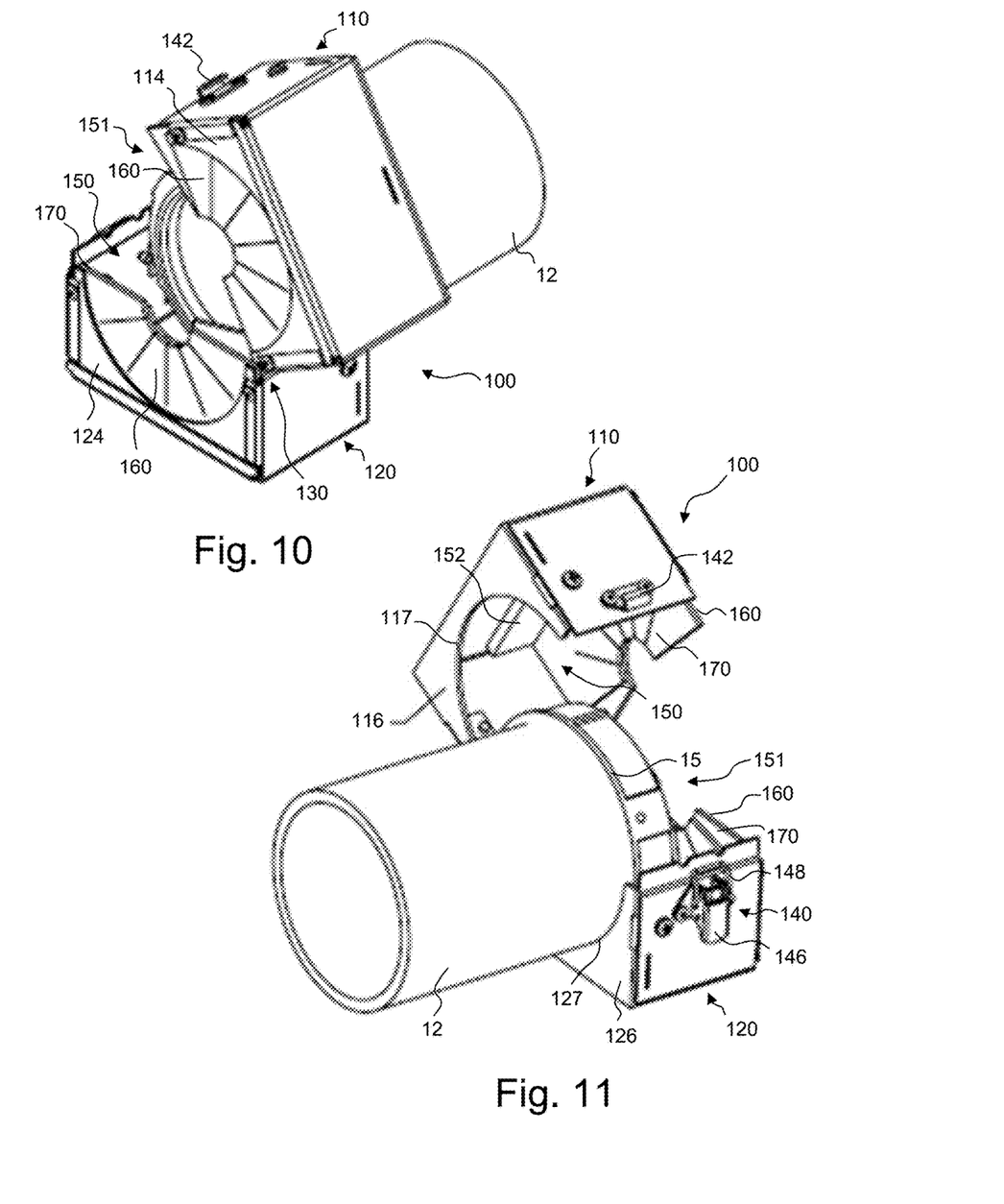
FIG. 10 is a front perspective view illustrating an exemplary firestopping apparatus as it is positioned about the end of a sleeve.
FIG. 11 is a rear perspective view illustrating the exemplary firestopping apparatus as it is positioned about the end of a sleeve.

To facilitate positioning the housing 102 about existing cables, conduits and the like, the first and second housing members 110, 120 are moveable relative to one another to an open configuration with an open space on at least one side of the housing 102 such that the housing 102 can be positioned about a sleeve 12, cables or conduits, as illustrated in FIGS. 10 and 11. In the illustrated embodiment, the first and second housing members 110, 120 are hingedly interconnected to one another along the side panels 112, 122, with a releasable latching assembly along the side panels 113, 123 to facilitate the open configuration. The invention is not limited to such a hinge and latch configuration, but may have any configuration which allows at least one side of the housing 102 to be opened such that a sleeve, cables or conduit can be received into the chamber 150 of the housing 102. For example, a latching assembly could be provided along both sides of the housing 102 such that both sides are disconnected to facilitate positioning of the housing 102 about the sleeve, cables or conduit.

Figure 6:
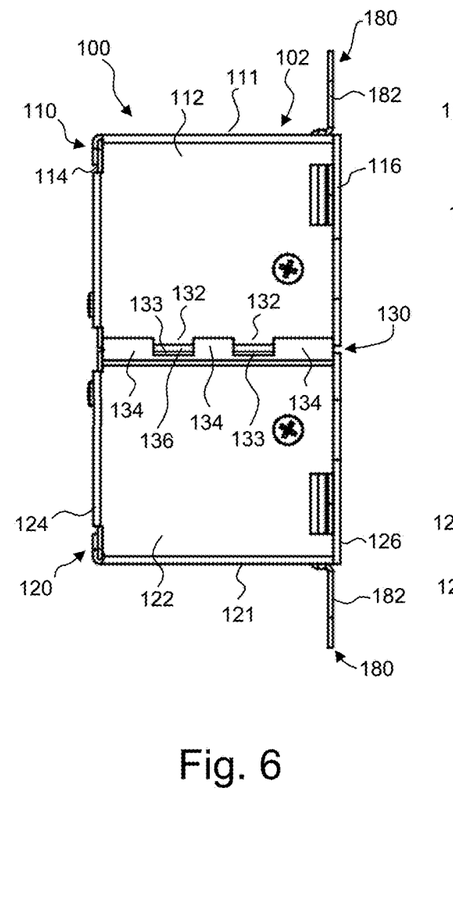
FIG. 6 is a right side elevation view of the firestopping apparatus of FIG. 3.

Referring to FIGS. 3, 6 and 9, in the present embodiment, the side panels 112 and 122 are interconnected to one another via a hinge assembly 130. The illustrated hinge assembly 130 is defined by fingers 132 of the side panel 112 extending between fingers 134 of the side panel 122. The fingers 132 have semicircular ends 133 (see FIG. 9) and the fingers 134 define through bores (not shown). A pin 136 extends through the through bores and the channels defined by the semicircular ends 133 to pivotally connect the first and second housing members 110, 112. The semicircular ends 133 allow the hinge assembly 130 to be disassembled in the event it is necessary to completely disconnect the first housing member 110 from the second housing member 120. It is understood that the fingers 132 could also define through bores if such disassembly is not desired.

Figure 5:
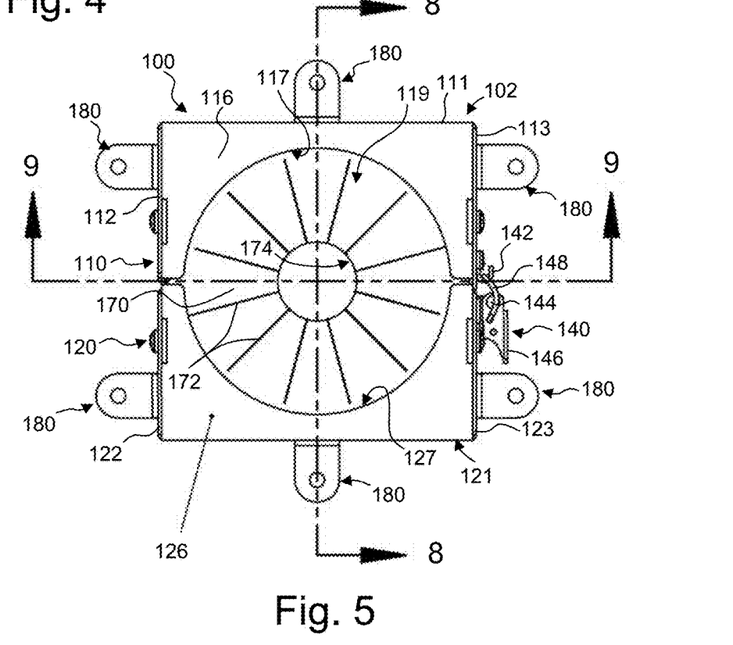
FIG. 5 is a rear elevation view of the firestopping apparatus of FIG. 3.
Figure 7:
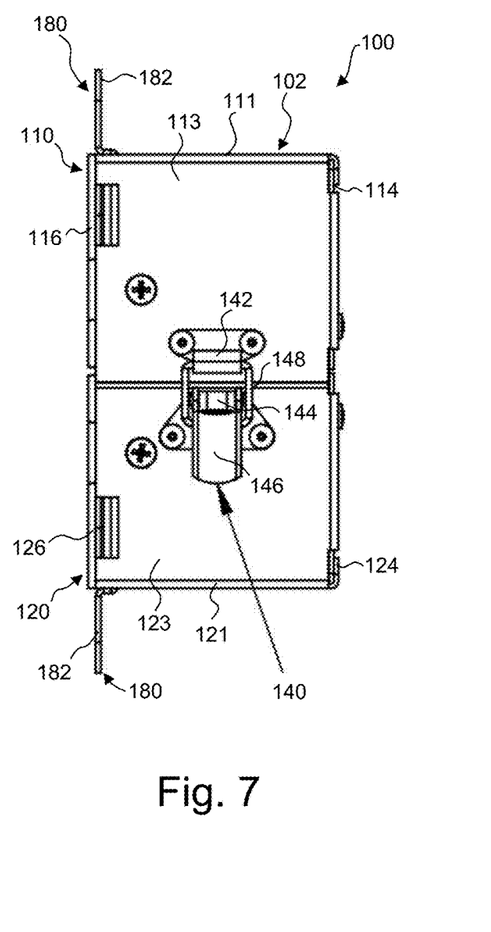
FIG. 7 is a left side elevation view of the firestopping apparatus of FIG. 3.

With reference to FIGS. 5 and 7, in the illustrated embodiment, the latching assembly 140 extends between side panels 113 and 123 to secure the housing 102 in the assembled configuration. In the illustrated embodiment, the latching assembly 140 has a draw latch configuration, however, the invention is not limited to such and other latch or lock assemblies may be utilized. The latching assembly 140 includes a hook 142 extending from side panel 113. A support member 144 is connected to side panel 123 and pivotally supports a lever 146. A ring 148 extends from the lever 146 and is configured to engage the hook 142. Pivoting of the lever 146 toward the hook 142 allows the ring 148 to be disengaged therefrom. Pivoting of the lever 146 to the locked position shown in FIG. 5 locks the ring 148 in engagement with the hook 142.

Referring to FIGS. 10-13, an exemplary application of the firestopping apparatus 100 to a sleeve 12 will be described. With reference to FIGS. 10 and 11, the latching assembly 140 is opened such that the ring 148 is disengaged from the hook 142 and the first housing member 110 is pivoted relative to the second housing member 120 to define a passage 151 into the internal chamber 150. The housing 102 is positioned about the sleeve 12 with the sleeve 12 seated within the semi-circular opening 127 of the rear panel 126. In the illustrated embodiment, the sleeve 12 includes a radial flange 15 which is positioned inside of the rear panels 116, 126 within the housing internal chamber 150.

Figure 12:
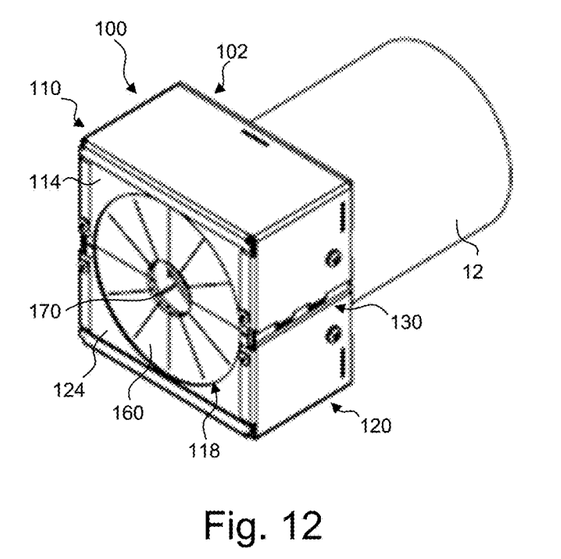
FIG. 12 is a front perspective view illustrating the exemplary firestopping apparatus positioned about the end of a sleeve.
Figure 13:
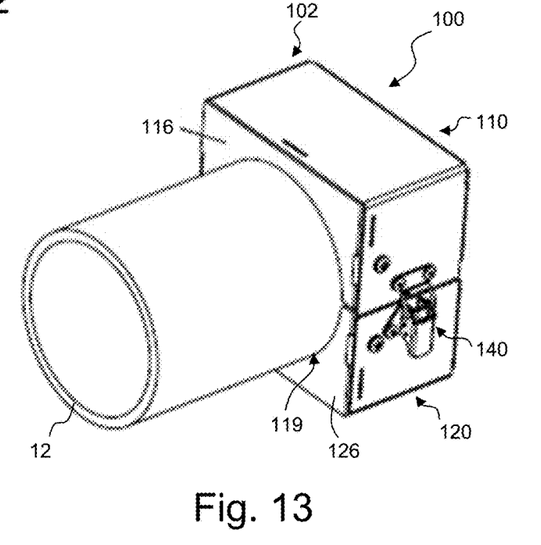
FIG. 13 is a rear perspective view illustrating the exemplary firestopping apparatus positioned about the end of a sleeve.

Once the sleeve 12 is positioned within one of the semi-circular openings, the first housing member 110 is pivoted toward the second housing member 120 until they are in the assembled position illustrated in FIGS. 12 and 13. The latching assembly 140 is then locked, drawing the housing members 110, 120 together and tightening the rear panels 116, 126 about the sleeve 12. The semi-circular openings 117, 127 are sized such that the rear opening 119 will have a diameter less than the diameter of the flange 15 such that when the housing 102 is in the assembled condition, the flange 15 is retained by the rear panels 116, 126. In applications wherein the sleeve 12 does not include a flange, and even in applications where a flange is present, the semi-circular openings 117, 127 may have a diameter slightly less than that of the sleeve 12 such that the rear panels 116, 126 bite into the sleeve 12 when the housing 102 is in the assembled condition such that sleeve 12 is retained by the rear panels 116, 126.

Any cables or conduits extending through the sleeve 12 will extend through the front opening 118 and will be surrounded by the sealing membranes 160, 170. The membranes 160, 170 provide remedial smoke and air sealing about the existing cables and conduits and also allow for future cable moves, adds, and changes. The apparatus 100 of the present invention preserves the ability to run additional cables without having to touch the apparatus 100 (e.g. re-open or re-close). Additionally, the apparatus 100 is generally maintenance free.

In the event of the fire or the like, the intumescent materials 152, 154 will rapidly expand and seal completely about the cables and conduits within the chamber 150. The firestopping apparatus 100 provides a compliant and reliable firestop and only needs to be provided on one side of barrier since it will stop fire and smoke penetration regardless of which side of the barrier the fire or smoke is located.

For applications wherein the building opening 10' does not include a sleeve, the apparatus 100 may include one or more mounting flanges 180 extending from the housing 102. Each of the flanges 180 includes a plate 182 with at least one screw hole 183. In the illustrated embodiment, each flange 180 also has a mounting portion 184 which extends from the plate 182 and is configured to extend into the housing 102 and lock the flange 180 to the housing 102. The flanges 180 may otherwise be removably or permanently secured to the housing, for example, via screws or welding. The number and position of the flanges 180 may be selected based on the intended application.

Referring to FIGS. 14-18, a firestopping apparatus 100' in accordance with another exemplary embodiment of the invention will be described. The firestopping apparatus 100' is similar to the previous embodiment and generally comprises the first and second housing members 110,' 120' that are interconnected to one another to define the housing 102' having an internal chamber 150. Like elements are numbered alike in each embodiment and only the distinct features will be described herein.

Figure 16:
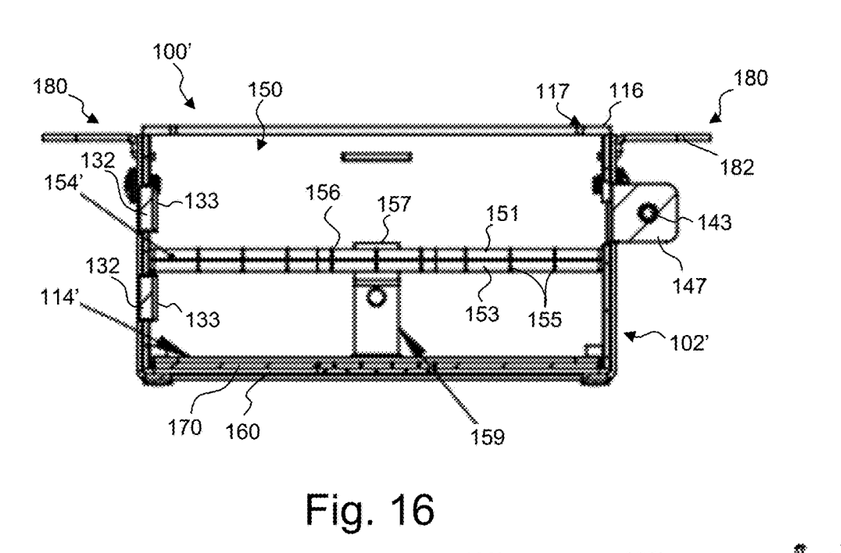
FIG. 16 is a cross-sectional view along the line 16-16 in FIG. 15.
Figure 17:
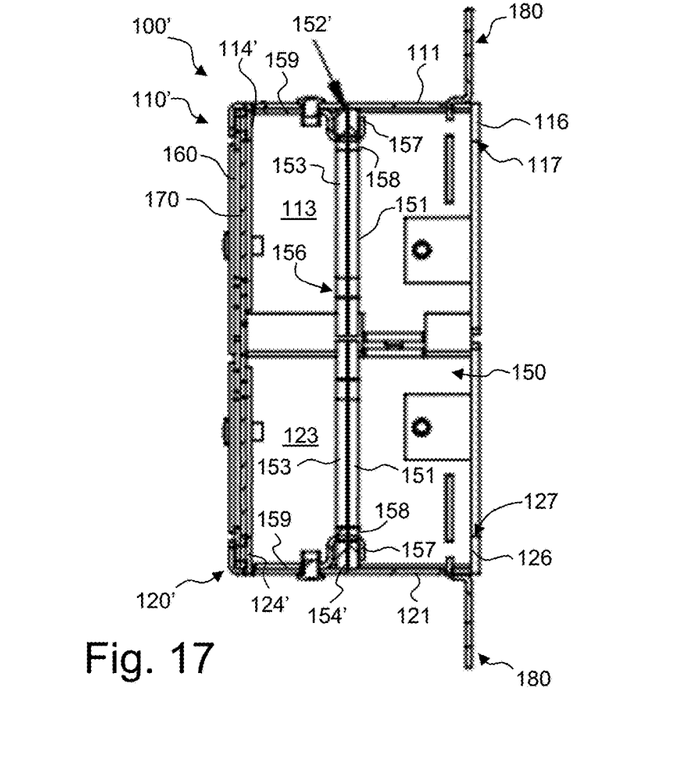
FIG. 17 is a cross-sectional view along the line 17-17 in FIG. 15.
Figure 18:
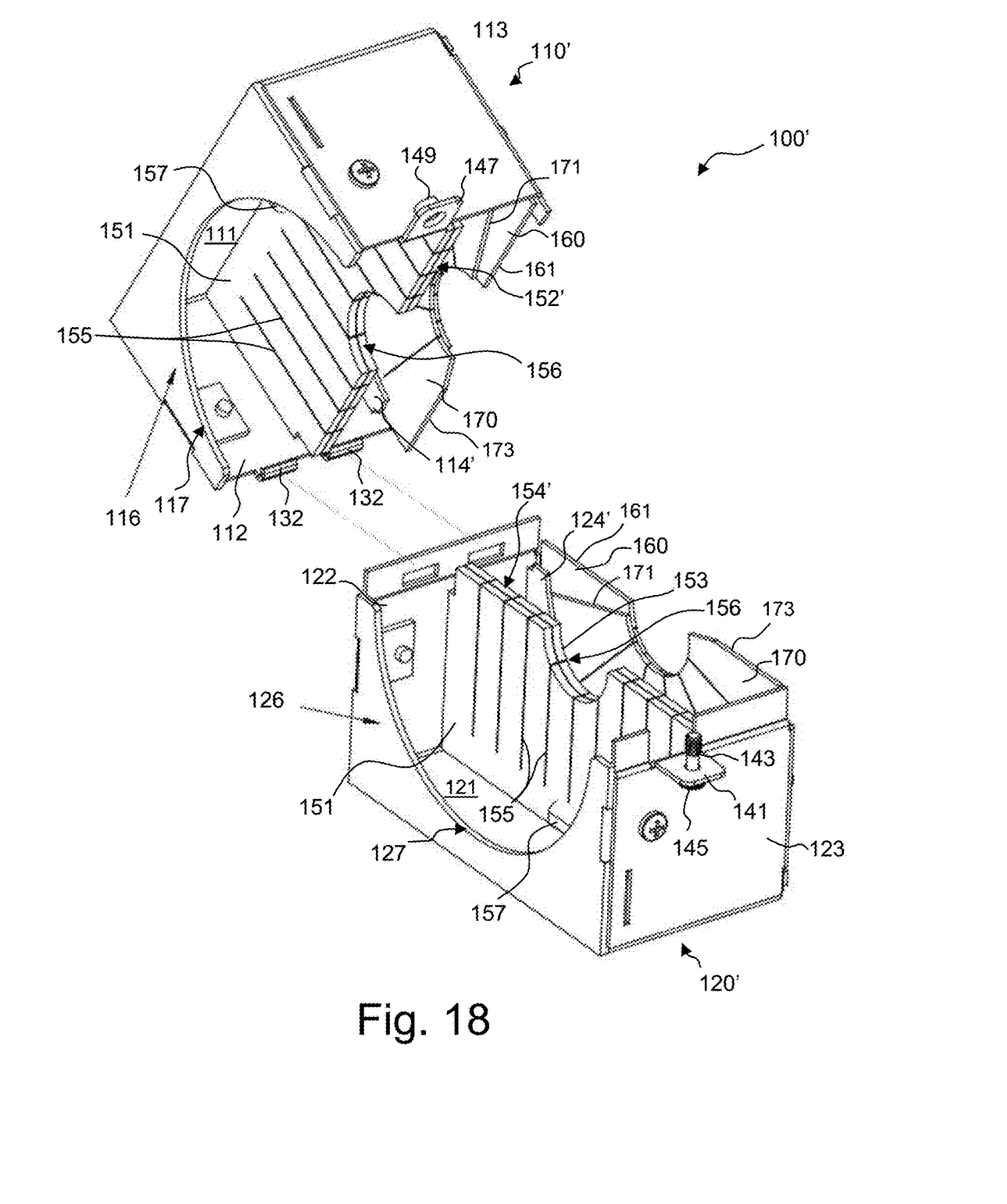
FIG. 18 is a rear, partially exploded perspective view illustrating the exemplary firestopping apparatus of FIG. 14.

With reference to FIGS. 16-18, it is noted that in the fire stopping apparatus 100' of the present embodiment, the first and second housing members 110', 120' are modified from the previous embodiment in that the front panels 114', 124' are positioned interiorly of the pair of sealing elastomeric membranes 160, 170. In other aspects, the front panels 114', 124' are substantially the same as in the previous embodiment.

Figure 19:
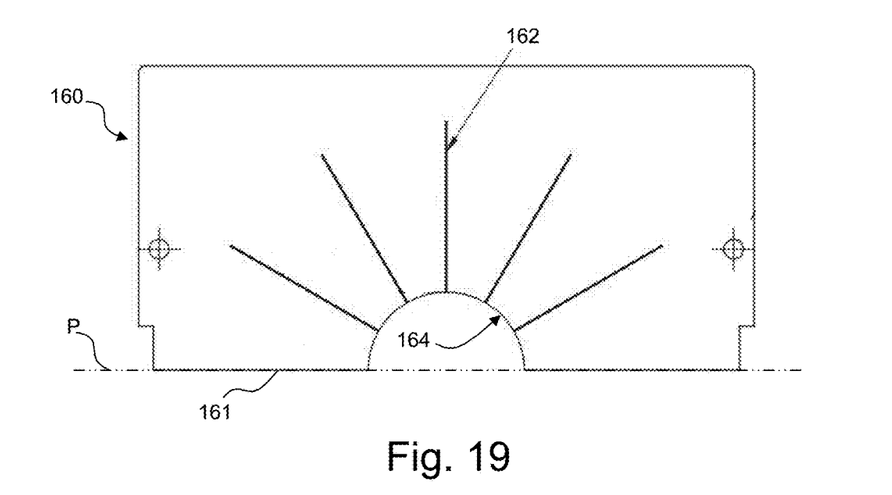
FIG. 19 is an elevation view of a first exemplary sealing elastomeric membrane and FIG. 20 is an elevation view of a second exemplary sealing elastomeric membrane.
Figure 20:
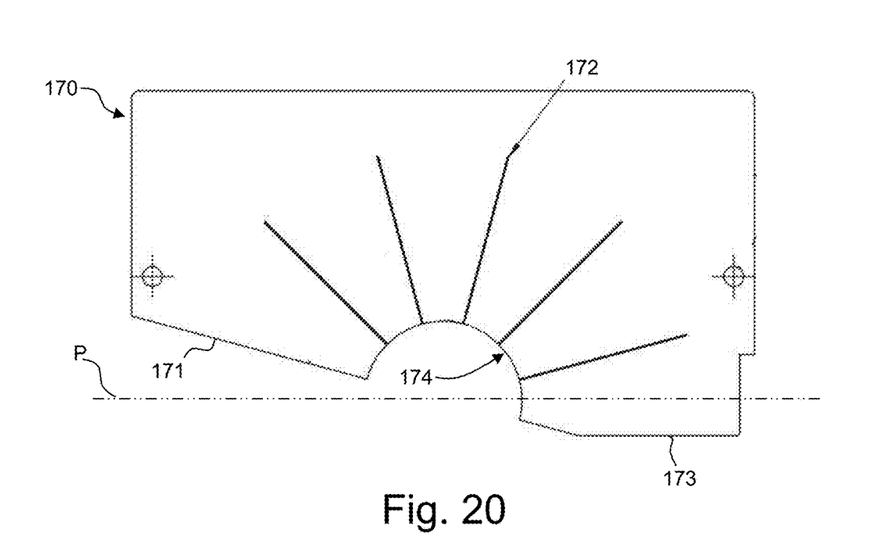

Additionally, with reference to FIGS. 18-20, the sealing elastomeric membranes 160, 170 have different configurations such that the joining line between membranes 160 is offset from the joining line between the membranes 170. As illustrated in FIG. 19, the inner edge 161 of the membrane 160 extends in a linear fashion along a plane P, however, as illustrated in FIG. 20, the membrane 170 has an angled edge, with a first portion 171 angled and extending on a first side of the plane P and a second angled portion 173 extending on a second opposite side of the plane P. As seen in FIG. 18, when the membranes 160 and 170 are positioned in the housing 102', the angled edge portions 171, 173 are offset from the edge portion 161 the opposite membrane 160, 170 overlaps the joining line of the other membrane 160, 170, furthering the sealing effect of the membranes 160, 170.

Figure 14:
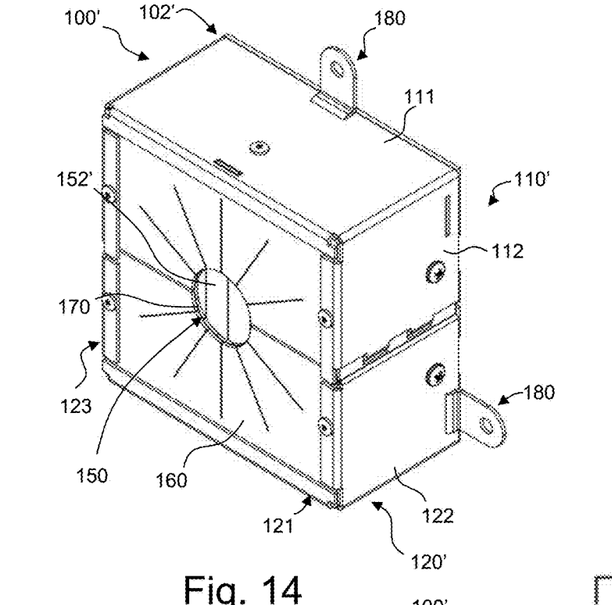
FIG. 14 is a front perspective view of an exemplary firestopping apparatus in accordance with another embodiment of the invention.
Figure 15:
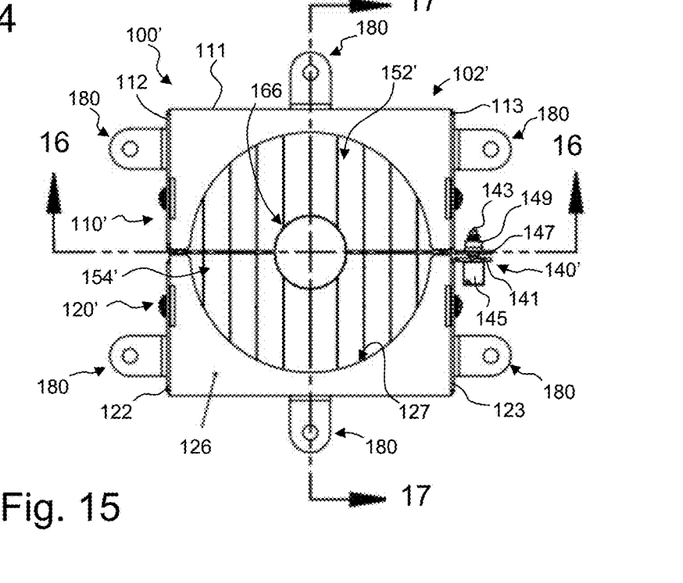
FIG. 15 is a rear elevation view of the firestopping apparatus of FIG. 14.

Additionally, in the fire stopping apparatus 100' of the present embodiment, the latching assembly 140' includes a securing screw 143 extending through a flange 141 extending from the side panel 123 of the second housing member 120'. A head 145 is provided for turning the securing screw 143. Opposite the securing screw 143, a flange 147 with a fixed securing nut 149 extends from the side panel 113 of the first housing member 110'. To secure the housing members 110', 120' together, the securing screw 143 is threadably engaged with the securing nut 149.

Figure 21:
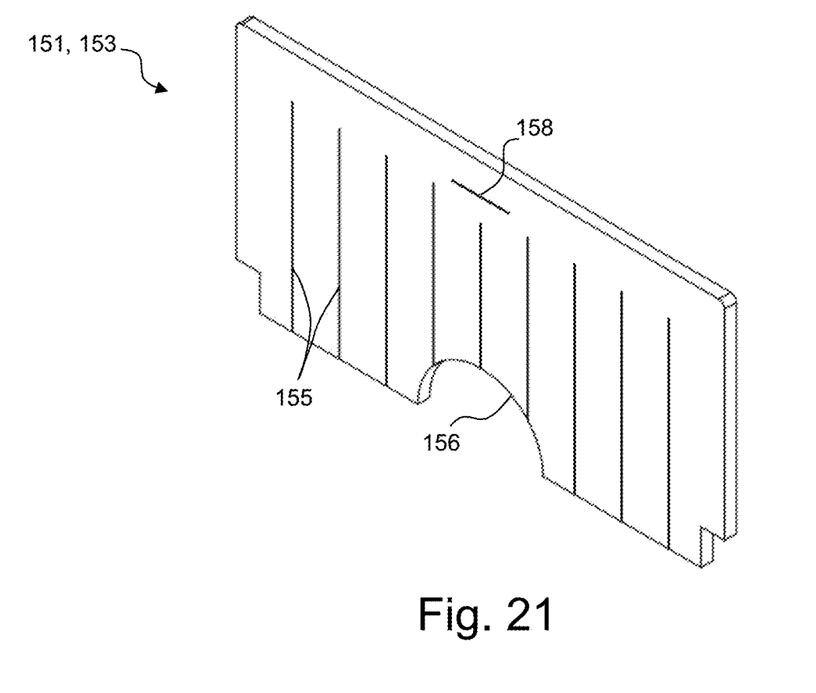
FIG. 21 is a perspective view of an exemplary curtain of intumescent material.

Also, with the fire stopping apparatus 100' of the present embodiment, the intumescent firestopping materials 152', 154' positioned in the internal chamber 150 are in the form of curtains 151, 153 which extend across each housing member 110', 120'. In the illustrated embodiment, each of the intumescent firestopping materials 152', 154' includes two such curtains extending along one another. More or fewer curtains may be utilized. Each curtain 151, 153 includes a series of slits 155 which facilitate passage of cables and the like therethrough. Additionally, each curtain 151, 153 defines a semi-circular opening 156 such that when the housing members 110', 120' are in an assembled condition, an opening 166 is defined through the intumescent firestopping materials 152', 154'.

With reference to FIGS. 16, 17 and 21, an exemplary method of mounting the curtains 151, 153 within the chamber 150 will be described. In the illustrated embodiment, each curtain 151, 153 includes a slit 158 therethrough which is configured to receive a hook portion 157 of a mounting hook 159. A mounting hook 159 extends along each end surface 111, 121 and includes a rounded hook portion 157 which extends through the slit(s) in one or more curtains to support the curtain relative to the respective housing member 110', 120'. Other mounting methods may alternatively or additionally be utilized.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:
1. A firestopping apparatus comprising:
a housing having a wall surface extending between opposed front and rear panels with an inner chamber defined therein, the front panel defining a front opening therethrough and the rear panel defining a rear opening therethrough, the housing including first and second housing members which are completely detachable from one another and moveable relative to one another between an assembled condition wherein the first and second housing members are interconnected and the wall surface is substantially continuous about the internal chamber, and an open condition wherein at least a portion of the first and second housing members are spaced from one another such that at least a portion of the wall surface is non-contiguous to define an opening into the internal chamber; and intumescent material positioned within the internal chamber.

2. The firestopping apparatus according to claim 1 wherein one or more mounting tabs extend outwardly from the housing.

3. The firestopping apparatus according to claim 1 wherein the first housing member is pivotally connected to the second housing member along a portion of the wall surface.

4. The firestopping apparatus according to claim 3 wherein a hinge is defined along the wall surface between the first and second housing members.

5. The firestopping apparatus according to claim 4 wherein the first and second housing members are completely detachable from one another via the hinge.

6. The firestopping apparatus according to claim 1 wherein a latching assembly is positioned along the wall surface to lock the housing in the assembled condition.

7. The firestopping apparatus according to claim 6 wherein the latching assembly has a draw latch configuration.

8. The firestopping apparatus according to claim 6 wherein the latching assembly has a screw and nut configuration.

9. A firestopping apparatus comprising:
a housing having a wall surface with an inner chamber defined therein, a front panel extending from the wall surface and defining a front opening therethrough, the housing including first and second housing members which are moveable relative to one another between an assembled condition wherein the first and second housing members are interconnected and the wall surface is substantially continuous about the internal chamber, and an open condition wherein at least a portion of the first and second housing members are spaced from one another such that at least a portion of the wall surface is non-contiguous to define an opening into the internal chamber; and
intumescent material positioned within the internal chamber;
wherein a sealing member extends across at least a portion of the front opening.

10. The firestopping apparatus according to claim 9 wherein the front panel is positioned reward of the sealing member.

11. The firestopping apparatus according to claim 9 wherein the sealing member includes at least two elastomeric sealing membranes positioned adjacent to one another.

12. The firestopping apparatus according to claim 11 wherein each of the elastomeric sealing membranes includes two portions which join along a joining line and the joining lines of adjacent sealing membranes are offset from one another.

13. The firestopping apparatus according to claim 9 wherein the sealing member includes at least one elastomeric sealing membrane.

14. The firestopping apparatus according to claim 13 wherein each elastomeric sealing membrane defines a central passage therethrough.

15. The firestopping apparatus according to claim 14 wherein each elastomeric sealing membrane includes a plurality of radial slits therethrough extending from the central passage.

16. A firestopping apparatus comprising:
a housing having a wall surface with an inner chamber defined therein, a front panel extending from the wall surface and defining a front opening therethrough, the housing including first and second housing members which are moveable relative to one another between an assembled condition wherein the first and second housing members are interconnected and the wall surface is substantially continuous about the internal chamber, and an open condition wherein at least a portion of the first and second housing members are spaced from one another such that at least a portion of the wall surface is non-contiguous to define an opening into the internal chamber; and
intumescent material positioned within the internal chamber;
wherein the intumescent material is in the form of one or more curtains supported within the internal chamber, each curtain having a width substantially less than a width of the housing wall.

17. The firestopping apparatus according to claim 16 wherein each of the one or more curtains has a plurality of slits formed therethrough, each slit extending to a free edge of the curtain.

18. The firestopping apparatus according to claim 16 wherein each of the one or more curtains has a mounting slit therethrough and a mounting hook positioned within the internal chamber extends through the mounting slit to mount the curtain within the internal chamber.

19. The firestopping apparatus according to claim 16 wherein the one or more curtains define a central opening therethrough.

20. The firestopping apparatus according to claim 16 wherein the intumescent material is in the form of at least two curtains supported within the internal chamber in adjacent relationship to one another.

* * * * *